UNITED STATES PATENT OFFICE.

FRÉDÉRIC SILVESTER MASON, OF NEW YORK, N. Y.

ALLYL SULFOCARBAMID BISMUTH TRI-IODID.

976,669.     Specification of Letters Patent.     Patented Nov. 22, 1910.

No Drawing.     Application filed October 20, 1909.     Serial No. 523,614.     (Specimen.)

*To all whom it may concern:*

Be it known that I, FRÉDÉRIC SILVESTER MASON, citizen of the United States, residing at New York, in the county of New York and State of New York, have invented certain new and useful Improvements in Allyl Sulfocarbamid Bismuth Tri-Iodids; and I do hereby declare the following to be a full, clear, and exact description of the invention, such as will enable others skilled in the art to which it appertains to make and use the same.

My invention relates to compounds of the organic radical, allyl $C_3H_5$ and more particularly to compounds of allyl sulfo-carbamid $CS(NH_2)NHC_3H_5$.

A frequent objection against the pharmaceutical preparations at present in use derived from the essential oil of mustard, allyl iso-sulfo-cyanate is the fact that they are unsuitable for internal administration and are mainly administered by means of hypodermic injections.

My invention has for its object the provision of a compound which will have all the therapeutic properties of allyl sulfo-carbamid but which may be administered internally and will not be irritating to the gastro-intestinal tract.

A further object of my invention is the provision of a compound which will be little affected by the gastric secretions or acid solutions but which will liberate nascent allyl sulfo-carbamid in weak alkaline solutions such as may be found in the intestinal canal.

My invention more particularly has reference to a new compound containing allyl sulfo-carbamid, bismuth and iodin in combination and same may be produced as follows:—To a solution of potassium iodid in water is added a solution of bismuth subnitrate in a mixture of hydrochloric acid in water and to the above is added a solution of allyl sulfo-carbamid in water. The new compound obtained is a red precipitate and is purified as will be hereinafter described.

A formula for producing my new compound is here given:—I make a solution of 25 grams of allyl sulfo-carbamid crystals in 500 c.c. of water. This solution is called #1. Another solution called #2 is made by dissolving 41.18 grams of bismuth subnitrate in 150 c.c. hydrochloric acid containing 20% HCl and 50 c.c. of water. A third solution called #3 is prepared by dissolving 71.6 grams of potassium iodid in 1000 c.c. water. To solution #3 I add 200 c.c. of solution #2, agitate and then add solution #1. The red precipitate which is formed is washed with dilute hydrochloric acid containing about 10% HCl and warm water and is finally washed with pure distilled water. The precipitate is then carefully dried and may be further purified by dissolving in acetone and reprecipitating in water to eliminate traces of other substances.

I do not wish to be confined to the exact quantities, proportions or procedure above given though I have found that the above formula will produce my new compound in a satisfactory manner. The probable reaction is as follows:—

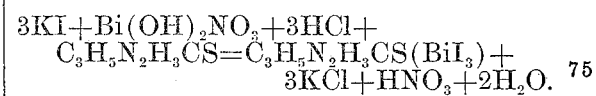

$$3KI + Bi(OH)_2NO_3 + 3HCl + C_3H_5N_2H_3CS = C_3H_5N_2H_3CS(BiI_3) + 3KCl + HNO_3 + 2H_2O.$$

The theoretical percentage composition based on molecular weights is as follows:—

| | |
|---|---|
| Allyl sulfo-carbamid | 16.48 |
| Bismuth | 29.506 |
| Iodin | 54.01 |

The product is administered as a triturate containing 10% allyl sulfo-carbamid bismuth tri-iodid, ten to twenty grains of said triturate constituting the average daily dose.

The finished product I obtain is a pasty mass, orange red in color, odorless, tasteless, neutral to litmus paper in alcoholic solution, soluble in ether, alcohol, acetone, chloroform or bisulfid of carbon but is insoluble in water or weak acid solutions. It is decomposed by weak alkalies.

What I claim is:—

As a new composition of matter, allyl sulfocarbamid bismuth tri-iodid derived from allyl sulfocarbamid, potassium iodid and bismuth subnitrate which is semi-fluid at ordinary temperatures, orange red in color, insoluble in weak acids but decomposed by weak alkalies and has the following formula:—$C_3H_5N_2H_3CSBiI_3$.

In testimony whereof I affix my signature in presence of two witnesses.

FRÉDÉRIC SILVESTER MASON.

Witnesses:
HARRY C. ADAMS,
HUGO MOCK.